United States Patent [19]
Merten et al.

[11] Patent Number: 5,708,074
[45] Date of Patent: Jan. 13, 1998

[54] ANIONICALLY STABILIZED AQUEOUS POLYVINYLBUTYRAL DISPERSIONS AND PROCESS FOR THEIR PREPARATION AND USE

[75] Inventors: Gerhard Merten; Ralph Schaefer, both of Wiesbaden; Markus Schafheutle, Hochheim, all of Germany; Martin Gerlitz, Graz, Austria

[73] Assignee: Hoechst Aktiengesellschaft, Frankfurt am Main, Germany

[21] Appl. No.: 640,715

[22] Filed: May 1, 1996

[30] Foreign Application Priority Data

May 2, 1995 [DE] Germany .......... 195 15 967.5

[51] Int. Cl.$^6$ .......... C08J 3/00; C08K 3/20; C08L 75/00; C08F 8/30
[52] U.S. Cl. .......... 524/591; 428/402; 428/423.1; 523/149; 524/507; 524/539; 524/839; 524/840; 525/123; 525/127; 525/128; 525/131; 525/455; 525/456
[58] Field of Search .......... 524/591, 839, 524/840, 507, 539; 525/123, 127, 128, 131, 455, 456; 523/149; 428/402, 423.1

[56] References Cited

U.S. PATENT DOCUMENTS

| | | | |
|---|---|---|---|
| 2,509,667 | 6/1948 | Ballinger | 200/52 |
| 2,532,223 | 11/1950 | Bromley | 260/23 |
| 2,611,755 | 9/1952 | Bromley | 260/29.6 |
| 2,686,724 | 8/1954 | Chenicek | 99/163 |
| 4,210,564 | 7/1980 | Pouchol | 260/29.6 |
| 4,499,236 | 2/1985 | Hermann et al. | 522/63 |
| 5,430,094 | 7/1995 | Gola et al. | 524/507 |
| 5,458,979 | 10/1995 | Hashimoto et al. | 428/425.9 |
| 5,525,669 | 6/1996 | Schafheutle et al. | 524/507 |

FOREIGN PATENT DOCUMENTS

| | | |
|---|---|---|
| 0 638 606 | 2/1995 | European Pat. Off. . |
| 4 235 151 | 4/1994 | Germany . |
| 58-026374 | 6/1979 | Japan . |
| 1 154 819 | 6/1969 | United Kingdom . |

*Primary Examiner*—Patrick Niland
*Attorney, Agent, or Firm*—Foley & Lardner

[57] ABSTRACT

A process for the preparation of water-dilutable polyvinylbutyral dispersions by (1) reacting an aliphatic acid having from one to three isocyanate-reactive groups and from one to three acid groups, or a mixture of such acids, with one or more polyfunctional isocyanates whose average functionality is at least two, where the quantity of the isocyanate component is chosen such that the ratio of the number of isocyanate groups to the number of isocyanate-reactive groups of the acid component is between 2.2:1 and 1.7:1; (2) then reacting from 25 to 75% of the remaining isocyanate groups with at least one monofunctional compound selected from monoalcohols and monoamines; and (3) reacting this NCO-functional emulsifier resin further with polyvinylbutyral and, if desired, with an appropriate plasticizer resin using a suitable auxiliary solvent. The polyvinylbutyral dispersions prepared in this way can be used as binders and binder components for coatings with good adhesion.

23 Claims, No Drawings

ANIONICALLY STABILIZED AQUEOUS POLYVINYLBUTYRAL DISPERSIONS AND PROCESS FOR THEIR PREPARATION AND USE

BACKGROUND OF THE INVENTION

Aqueous preparations comprising polyvinylbutyral are known. The majority of such systems are based on the use of ionic emulsifiers (salts of fatty acids, alkanesulfonates or alkyllaurylsulfonates: U.S. Pat. No. 2,686,724, U.S. Pat. No. 2,532,223, U.S. Pat. No. 2,611,755, and U.S. Pat. No. 2,509,667, and DE-A 27 52 054) or of nonionic emulsifiers (polyvinyl alcohol (JP-A 58/026374), ethoxylated fatty alcohols, reaction products of polyalkylene glycols with polyepoxides (DE-P 43 27 369)).

A general disadvantage of all of these systems which contain outside emulsifiers, however, is that it is not possible to carry out direct pigmenting of coating materials which comprise such dispersions as the binder component, owing to the fact that the shear stability of the dispersions is insufficient. Further disadvantages are incurred by the type of emulsifier: in the case of high molecular weight polyethylene glycol types, the water resistance of the films decreases rapidly, and, when low molecular weight ionic emulsifiers are used, migration of the emulsifier molecules in the film and leaching from the resin combine are possible, causing a continuously changing surface composition and/or changing film properties.

Self-emulsifying aqueous polyvinylbutyral dispersions have also been described. In such dispersions, the groups (of ionic or nonionic type) which are responsible for dilutability in water are introduced into the polymer before the acetalization process. In DE-A 32 46 605, a polyethylene oxide graft base is used to prepare the polyvinyl alcohol, which is subsequently acetalized and, because of the content of polyethylene glycol segments, leads to water-dilutable end products. In DE-A 42 35 151, a polyvinyl alcohol copolymer is prepared with ethylenesulfonate (in salt form), which copolymer is subjected to acetalization and gives rise to water-dilutable products due to the content of sulfonate groups.

Since the starting points in both cases are aqueous polyvinyl alcohol solutions, the dispersions obtained have a decidedly low solids content. Subsequent blending with plasticizer resins, which are used very frequently in order to improve film formation, is rendered virtually impossible by the reduced compatibility of the modified products. Furthermore, because of the polyethylene glycol structure or the sulfonate groups, the products are highly sensitive to water and do not satisfy the requirements for industrial application.

SUMMARY OF THE INVENTION

It has now been found that a combination of "outside emulsification" and "self-emulsifying components" by means of an NCO-functional emulsifier resin gives rise to a synergy of positive effects: dispersions are obtained which have high solids contents by mass (40 to 50%), are shear-stable, are free of low molecular weight—and therefore migratable—components, have good stability on storage and give rise, due to the use of an emulsifier resin rather than low molecular weight emulsifiers, to substantially reduced foaming. Moreover, the process according to the invention enables the resin composition, which is optimum for an intended application (low-acetalized, normally acetalized or highly acetalized PVB grades, different molecular masses, or combinations with plasticizer resins), to be converted into an aqueous dispersion form.

The invention relates accordingly to a process for the preparation of water-dilutable polyvinylbutyral dispersions, which comprises reacting A an aliphatic acid having from one to three groups which are reactive toward isocyanate and from one to three acid groups, or a mixture of such acids, with B one or more polyfunctional isocyanates whose average functionality is at least two, wherein the quantity of the isocyanate component B is chosen such that the ratio of the number of isocyanate groups to the number of groups of component A which are reactive toward isocyanate is between 2.2:1 and 1.7:1; continuing the reaction until at least 70%, preferably at least 80%, and most preferably at least 90%, of the isocyanate reactive groups have been consumed (which is equivalent to reaching this percentage of residual isocyanate content);

thereafter reacting from 25 to 75% of the remaining isocyanate groups with

C at least one monofunctional compound selected from monoalcohols and monoamines until at least 70%, preferably at least 80%, and most preferably at least 90%, of the isocyanate reactive groups have been consumed, to produce an NCO-functional emulsifier resin; and further reacting this NCO-functional emulsifier resin with D a mixture of proportions by mass of D1 from 30 to 100% of polyvinylbutyral and D2 from 0 to 70% of an appropriate plasticizer resin or of a mixture of appropriate plasticizer resins, using a suitable auxiliary solvent, until complete conversion of all isocyanate groups, with the proviso that the sum of the proportions by mass of D1 and D2 is 100% and the reaction product formed has a quantity of acid groups which is such that the acid number of the solid resin (mass of KOH required for neutralization per unit mass of solid resin) is between 5 and 50 mg/g.

In accordance with another aspect of the present invention, there has also been provided an aqueous polyvinylbutyral dispersion prepared by the process defined above.

In accordance with an additional aspect of the invention, there is provided a mixture of aqueous binders including an aqueous polyvinylbutyral dispersion according to the invention, preferably in combination with an aqueous dispersion of a phenolic resin and/or an aqueous dispersion of an amino resin.

According to a further aspect of the invention, there has been provided a coating composition comprising at least one coating resin and a binder comprising an aqueous polyvinylbutyral dispersion according to the invention.

Still another aspect of the invention provides a binder for use with abrasives, comprising an aqueous phenolic resin and a flexibilizer resin comprising an aqueous polyvinylbutyral dispersion according to the invention, as well as an abrasive, comprising a plurality of abrasive particles bound together with the binder.

There is also provided according to the invention an adhesion system, comprising a substrate, an adhesion primer applied to the substrate and an adhered layer applied to the adhesion primer, wherein the adhesion primer comprises the aqueous polyvinylbutyral dispersion as defined above.

DETAILED DESCRIPTION OF PREFERRED EMBODIMENTS

The invention will now be described more fully with reference to several preferred embodiments.

After neutralization of at least 50% of the free acid groups with inorganic bases, ammonia, amines or amino alcohols, the products according to the invention are diluted with deionized water.

The auxiliary solvent used is distilled off from the dispersion, depending on the viscosity of the product, either before neutralization, at reduced pressure, or in an azeotrope, at atmospheric or reduced pressure.

As component A, saturated, linear, branched or cyclic aliphatic acids are employed which have from one to three groups which are reactive toward isocyanate and have 2 to 25 carbon atoms, preferably 3 to 10 carbon atoms. The groups which are reactive toward isocyanate are selected from hydroxyl groups, primary and secondary amino groups and mercapto groups, with hydroxyl groups being preferred. The acid groups are selected from carboxylic, sulfonic and phosphonic acid groups, with carboxylic acids being preferred. In general they have 1 to 3 acid groups, and preferably one acid group per molecule. Examples of such compounds are hydroxypivalic acid, dihydroxypropionic acid, dihydroxysuccinic acid, tartaric acid, citric acid and malic acid, and also glutamic acid, lysine, serine, taurine, aminoethyl- and aminopropylphosphonic acid, mercaptoacetic acid, dimercaptopropanesulfonic acid and 3-mercaptopropanesulfonic acid. Hydroxycarboxylic acids are preferred; a particularly preferred group comprises the dihydroxyalkanoic acids, and among these the 2,2-dimethylolalkanoic acids, such as 2,2-dimethylolacetic acid, 2,2-dimethylolpropionic acid and 2,2-dimethylolpentanoic acid.

For ease of carrying out the synthesis, component A can be dissolved in an inert, high-boiling (i.e., boiling point above 100° C.), water-compatible solvent (e.g., N-methylpyrrolidone), which later on also provides better leveling and improved film formation. Commonly, proportions by mass of from 0 to 20% (based on the final solid resin mass) of such solvents (coalescence agents) are employed. Solvents having NCO-reactive groups (for example butylglycol, glycol ethers) are if appropriate added only after the isocyanate reaction has ended.

The isocyanate component B comprises any desired organic polyfunctional isocyanates having free isocyanate groups which are bonded to aliphatic, cycloaliphatic, araliphatic and/or aromatic structures. The isocyanates have 3 to 30 carbon atoms, preferably 9 to 20 carbon atoms. Diisocyanates are preferably employed. In a further preferred embodiment, up to 10% of the diisocyanates are replaced by isocyanates of higher functionality. The allophanates, isocyanurates and biurets of the above-mentioned diisocyanates can also be used within the context of the invention. The composition of the isocyanate component is selected in accordance with the viscosity of the resulting products and with the particular requirement of the intended application. Examples of suitable diisocyanates are the aliphatic diisocyanates diisocyanatomethane, diisocyanatoethane and diisocyanatobutane, hexamethylene diisocyanate, trimethylhexamethylene diisocyanate, cycloaliphatic diisocyanates, such as isophorone diisocyanate, 1,4-diisocyanatocyclohexane and 4,4'-diisocyanatodicyclohexylmethane, aromatic diisocyanates, such as tolylene diisocyanate (TDI), its technical-grade isomer mixture, 4,4'-diphenylmethane diisocyanate, 3,3'-dimethyl- and 3,3'-dimethoxy-diphenyl 4,4'-diisocyanate (tolidine and anisidine diisocyanate), and araliphatic diisocyanates, such as tetramethylxylylene diisocyanate. Examples of suitable isocyanates of higher functionality are the adducts of diisocyanates with trihydric or higher polyhydric alcohols, such as the adduct of trimethylolpropane with three moles of TDI, the above-mentioned isocyanurates of diisocyanates, or "polymeric MDI", which is a technical-grade mixture of dinuclear, trinuclear and higher polynuclear polyisocyanates, prepared by phosgenization of the polyamine mixture obtained in the reaction of formaldehyde with aniline.

If the reactivity of the isocyanates employed with component A and/or component C is not sufficient, use is made of catalysts which are known for the isocyanate reaction and are familiar to the person skilled in the art (examples being dibutyltin dilaurate and triethylamine).

The monoalcohols of component C are preferably aliphatic alcohols having a linear or branched carbon chain and from 2 to 30 carbon atoms. In addition to conventional alcohols, it is also possible to employ monoetherified mono-, di- or oligoglycols containing oxyalkylene groups having from two to four carbon atoms and a degree of polymerization of up to about 20, reaction products of monoepoxides with (saturated or unsaturated) monocarboxylic acids having an aliphatic, cycloaliphatic and/or aromatic structure, monohydroxy-functional esters of (meth)acrylic acid, and/or hydroxy-functional allyl ethers (for example trimethylolpropane diallyl ether).

The monoamines of component C are selected from the aliphatic, linear and branched, primary and secondary monoamines having 2 to 30 carbon atoms. Examples are n-butylamine, 2-ethylhexylamine, isodecylamine and stearylamine. Also suitable are polyoxyalkylene-monoamines, which may contain oxyalkylene groups having 2 to 4 carbon atoms. Such amines are available, for example, under the commercial names ®Jeffamine M and ®Novamin. Alkoxyalkylamines are also suitable as a constituent of component C, one example being 2-methoxyethanolamine.

It is also possible to employ mixtures of monoamines and monoalcohols (including combinations between the two classes).

Component D consists of a mixture of proportions by mass of

D1 from 30 to 100%, preferably from 35 to 95%, of polyvinylbutyral or a mixture of polyvinylbutyrals, and D2 from 0 to 70%, preferably from 5 to 65%, of an appropriate plasticizer resin or a mixture of appropriate plasticizer resins, the sum of the proportions by mass of D1 and D2 always being 100%, with the proviso that the end product according to the invention contains acid groups in a quantity which corresponds to an acid number of the solid resin of from 5 to 50 mg/g.

Suitable forms of polyvinylbutyral for the claimed dispersions are all customary and known grades of polyvinylbutyral. Examples of customary characteristics are: viscosity (6% strength solution in methanol at 20° C.) from 1 to 200 mPa.s; degree of acetalization from 65 to 90% (calculated as polyvinylacetal); proportion of acetate by mass from 2 to 5% (calculated as polyvinyl acetate); proportion by mass of OH groups from 10 to 30% (calculated as polyvinyl alcohol).

Plasticizer resins improve the film-forming properties and the flexibility of the polyvinylbutyral dispersions. Examples of appropriate plasticizer resins are phenolic resins, novolaks, dialkyl phthalates, castor oil, epoxy resins and special alkyd resins. These are conventional.

Auxiliary solvents which can be used are solvents having a maximum boiling point of 150° C., which preferably form an azeotrope with water and possess good solvency for the polyvinylbutyral. Where the auxiliary solvent includes NCO-reactive groups, it can be added only after complete reaction of the diisocyanates. Depending on the viscosity of the product according to the invention, the auxiliary solvent is distilled off from the dispersion before neutralization, under reduced pressure, or in an azeotrope (possibly also under reduced pressure).

For the neutralization, inorganic bases (lithium hydroxide, sodium hydroxide or potassium hydroxide), aqueous ammonia solutions or commercially customary amines are used. In order to maximize the solids content of the dispersion, it is common to use only exactly the amount of neutralizing agent which is sufficient to stabilize the dispersion (however, at least 50% of the free acid groups are neutralized).

Films based on the dispersions according to the invention show outstanding adhesion to metal, plastics and glass. Primers produced therewith also show good intercoat adhesion, giving them good overcoatability.

Depending on the nature of the plasticizer resin, it is also possible to produce films having excellent hardness, water resistance and anti-corrosion properties.

Dispersions according to the invention can therefore be used as binders for general coatings, wash primers, industrial coatings, temperature-resistant coatings (e.g., radiator coating), packaging coatings, adhesion primers, welding primers, coatings for flooring, roadmarking paints, and adhesives.

In combination with aqueous systems which are compatible (i.e., which do not separate out when combined), the dispersions according to the invention can be employed for numerous further applications. Particular reference may be made to their combination with aqueous phenolic resins, thereby making it possible to achieve plasticization of the films without loss in temperature stability and water resistance. This is of interest, in particular, for the abrasives sector, where the phenolic resins employed in the base binder are too hard. In combination with dispersions according to the invention, the results are a positive plasticization, an improvement in the adhesion to various substrates, and an enhanced drying rate. In combination with water-dilutable amino resins (e.g., melamine- and urea-formaldehyde precondensates) as well, the same effects as with phenolic resins are achieved.

In the description and in the examples which follow, all contents and concentrations are given—unless expressly stated otherwise—as proportions by mass, which are stated in the unit % (g/100 g).

EXAMPLES

Example 1

446 g of a 30% strength solution of dimethylolpropionic acid (1 mol of the acid) in N-methylpyrrolidone (NMP) are added dropwise to 348 g of commercial tolylene diisocyanate (TDI, 2 mol). During this addition the temperature does not exceed 40° C.; cooling is carried out if necessary. Once the calculated theoretical isocyanate group content of 10.5% has been reached, a mixture of 54 g of isopropyl alcohol (0.9 mol) and 134 g of a reaction/product of ricinene fatty acid and ®Cardura E10 (glycidyl ester of neodecanoic acid, 0.25 mol) is added dropwise; the mixture is held at 50° C. until the calculated theoretical isocyanate group content of 3.6% is reached.

At this point, 600 g of xylene, 900 g of ®Beckopox EM 460 (solvent-free reaction product of bisphenol A diglycidyl ether, phenol and bisphenol A) and 900 g of polyvinylbutyral in the form of a mixture of 600 g of ®Mowital B 20 H (polyvinylbutyral) and 300 g of ®Mowital B 30 HH (polyvinylbutyral) are added in portions and the resin solution is heated slowly to a maximum of 120° C. Stirring is carried out until a homogeneous resin solution has formed.

After cooling to 95°–100° C., 100% of the free carboxyl groups are neutralized with 5% strength ammonia solution, and then the mixture is diluted with deionized water to a solids content of about 45% by mass (without taking into account the xylene). At this point, the xylene is distilled off quantitatively from the dispersion, and the dispersion is readjusted to a solids content of 50% by mass using deionized water.

Characteristics of the dispersion obtained:

Solids content by mass: 49.9%

Acid number (solid resin): 23 mg/g pH (25% strength solution): 6.9

Example 2

336 g of hexamethylene diisocyanate (HMDI), 134 g of dimethylolpropionic acid and 200 g of NMP are stirred at max. 55° C. until the calculated theoretical isocyanate content of 12.5% by mass is reached (if the reaction does not proceed quickly, it can be catalyzed using dibutyltin dilaurate or triethylamine). To the resulting addition product is added a mixture of 117 g of 2-ethylhexanol (0.9 mol) and 75 g of trimethylolpropane diallyl ether (0.3 mol), and the mixture is reacted at 70° C. until an isocyanate group content of 3.9% is reached.

At this point, 600 g of xylene, 200 g of Beckopox EM 460/solvent-free and 600 g of a polyvinylbutyral mixture comprising 400 g of Mowital B 20 H and 200 g of Mowital B 40 H are added, with slow heating to a maximum of 120° C. Stirring is carried out until a homogeneous resin solution has formed.

After cooling to 95°–100° C., 75% of the carboxyl groups are neutralized with LiOH (5% strength solution), and the mixture is diluted with deionized water to a solids content of 40% by mass (without taking into account the xylene).

The xylene is then distilled off quantitatively from the dispersion, in an azeotrope, and a solids content of 40% by mass is established.

Characteristics of the dispersion obtained:

Solids content by mass: 40.2%

Acid number: 38 mg/g pH (25% strength solution): 8.5

Example 3

(Control Experiment)

100.5 g of hydroxypivalic acid (0.85 mol) and 20.1 g of dimethylolpropionic acid (0.15 mol) are stirred with 193.2 g of HMDI (1.15 mol) and 200 g of NMP at a maximum of 55° C. until the theoretical isocyanate group content of 9.4% has been reached.

930 g of Beckopox EM 460/solvent-free, 930 g of Mowital B 20 H and 500 g of xylene are added, and the mixture is heated slowly to a maximum of 120°. Stirring is carried out until a homogeneous resin solution has formed.

At 120° C., vacuum is applied (90 mbar) and the xylene is distilled off from the resin melt. After cooling to 100° C., 90% of the carboxyl groups (theoretical acid number of the solid resin=25.8 mg/g) are neutralized with 5% strength ammonia solution; the mixture is then diluted with deionized water. The resulting dispersion is inhomogeneous.

Example 4

(Control Experiment)

Experiment 3 is repeated but the xylene is distilled off only after neutralization with LiOH (90% of the carboxyl groups as above) and dilution with water. Even on dilution with water the dispersion is inhomogeneous, and on azeotropic distillation breaks down into solid resin and aqueous phase.

Example 5

Wash Primer or Shop Primer

The binder from Example 1 is mixed with:

5.1 inorganic or organic coloring pigments (from 1 to 100% of the mass of solid binder), or 5.2 anti-corrosion pigments (from 0.1 to 80% of the mass of solid binder, preferably zinc phosphate), or with 5.3 fillers, preferably talc or barium sulfate, in a quantity of from 2 to 200% of the mass of solid binder, or 5.4 mixtures of two or three of the pigments or fillers listed under 5.1 to 5.3, in a quantity of from 1 to 300% of the mass of the solid binder.

Coating materials prepared in this way, with or without the addition of phosphoric acid (from 0 to 30% based on the mass of solid binder) exhibit rapid drying, high hardness after drying, and good adhesion to iron, aluminum, galvanized steel and noble metals, and good protection against corrosion.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A process for the preparation of water-dilutable polyvinylbutyral dispersions, which comprises reacting A an aliphatic acid having from one to three groups which are reactive toward isocyanate and from one to three acid groups, or a mixture of such acids, with B one or more polyfunctional isocyanates whose average functionality is at least two, wherein the quantity of the isocyanate component B is chosen such that the ratio of the number of isocyanate groups to the number of groups of component A which are reactive toward isocyanate is between 2.2:1 and 1.7:1;

continuing the reaction until at least 70% of the isocyanate reactive groups have been consumed;

thereafter reacting from 25 to 75% of the residual isocyanate groups with

C at least one monofunctional compound selected from monoalcohols and monoamines to produce an NCO-functional emulsifier resin; and further reacting this NCO-functional emulsifier resin with D a mixture of proportions by mass of D1 from 30 to 100% of polyvinylbutyral and D2 from 0 to 70% of a plasticizer resin or of a mixture of plasticizer resins, in the presence of an auxiliary solvent, until achievement of substantially complete conversion of all isocyanate groups, with the proviso that the sum of the proportions by mass of D1 and D2 is 100% and the reaction product formed is a resin having a quantity of acid groups which is such that the acid number based on solid resin is between 5 and 50 mg/g.

2. A process as claimed in claim 1, wherein component A comprises one or more saturated, linear, branched or cyclic aliphatic acids having 2 to 25 carbon atoms, which are selected from carboxylic, sulfonic and phosphonic acids.

3. A process as claimed in claim 2, wherein component A comprises one or more saturated, linear, branched or cyclic aliphatic carboxylic acids having 2 to 25 carbon atoms.

4. A process as claimed in claim 1, wherein the isocyanate-reactive groups of component A are selected from hydroxyl groups, primary and secondary amino groups and mercapto groups.

5. A process as claimed in claim 4, wherein the isocyanate-reactive groups of component A comprise hydroxyl groups.

6. A process as claimed in claim 4, wherein the compounds of component A comprise two hydroxyl groups and one carboxylic acid group.

7. A process as claimed in claim 1, wherein dimethylolpropionic acid is employed as component A.

8. A process as claimed in claim 1, wherein component A is dissolved in an inert, high-boiling, water-miscible solvent.

9. A process as claimed in claim 1, wherein component B comprises one or more organic diisocyanates.

10. A process as claimed in claim 9, wherein up to 10% of the isocyanates of component B comprise isocyanates of higher functionality than said diisocyanates.

11. A process as claimed in claim 9, wherein the diisocyanates of component B are selected from aliphatic, cycloaliphatic and aromatic diisocyanates having 3 to 30 carbon atoms.

12. A process as claimed in claim 1, wherein component C is selected from aliphatic alcohols having a linear or branched carbon chain with 2 to 30 carbon atoms; monoetherified mono-, di- and oligoglycols containing oxyalkylene groups having in each case from two to four carbon atoms and a degree of polymerization of up to 20; reaction products of monoepoxides with aliphatic, cycloaliphatic or aromatic monocarboxylic acids; monohydroxy-functional esters of acrylic or methacrylic acid; hydroxy-functional allyl ethers; aliphatic, linear or branched, primary and secondary monoamines having 2 to 30 carbon atoms; polyoxyalkylene-monoamines containing oxyalkylene groups having from two to four carbon atoms; alkoxyalkylamines having 3 to 30 carbon atoms, or mixtures of these compounds.

13. A process as claimed in claim 1, wherein the polyvinylbutyral of component D1 has a solution viscosity of from 1 to 200 mPa.s, measured on a 6% strength methanolic solution at 23° C., a degree of acetalization of from 65 to 90%, a proportion by mass of acetate groups of from 2 to 5%, and a proportion by mass of hydroxyl groups of from 10 to 30%.

14. A process as claimed in claim 1, wherein the plasticizer resin is selected from phenolic resins, novolaks, dialkyl phthalates, epoxy resins, castor oil and alkyd resins, or a mixture.

15. An aqueous polyvinylbutyral dispersion prepared by the process of claim 1.

16. An aqueous polyvinylbutyral dispersion, prepared by the process of claim 1, comprising an organic solvent in a proportion by mass of from 0.5 to 20%.

17. A mixture of aqueous binders comprising an aqueous polyvinylbutyral dispersion as claimed in claim 15.

18. A mixture of aqueous binders comprising an aqueous polyvinylbutyral dispersion as claimed in claim 15 and an aqueous dispersion of a phenolic resin.

19. A mixture of aqueous binders comprising an aqueous polyvinylbutyral dispersion as claimed in claim 15 and an aqueous dispersion of an amino resin.

20. A coating composition comprising at least one coating resin and a binder comprising an aqueous polyvinylbutyral dispersion as claimed in claim 15.

21. A binder for use with abrasives, comprising an aqueous phenolic resin and a flexibilizer resin comprising an aqueous polyvinylbutyral dispersion as claimed in claim 15.

22. An abrasive, comprising a plurality of abrasive particles bound together with the binder of claim 21.

23. An adhesion system, comprising a substrate, an adhesion primer applied to the substrate and an adhered layer applied to the adhesion primer, wherein the adhesion primer comprises the aqueous polyvinylbutyral dispersion as claimed in claim 16.

\* \* \* \* \*